United States Patent
Pan et al.

(10) Patent No.: US 11,290,872 B2
(45) Date of Patent: Mar. 29, 2022

(54) METHOD FOR REPORTING BLIND DECODING CAPABILITY, BLIND DECODING CONFIGURATION, BLIND DECODING METHOD, TERMINAL AND BASE STATION

(71) Applicant: VIVO MOBILE COMMUNICATION CO., LTD., Chang'an Dongguan (CN)

(72) Inventors: Xueming Pan, Chang'an Dongguan (CN); Xiaodong Shen, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 80 days.

(21) Appl. No.: 16/625,493

(22) PCT Filed: Jun. 13, 2018

(86) PCT No.: PCT/CN2018/091036
§ 371 (c)(1),
(2) Date: Dec. 20, 2019

(87) PCT Pub. No.: WO2018/233524
PCT Pub. Date: Dec. 27, 2018

(65) Prior Publication Data
US 2020/0213837 A1    Jul. 2, 2020

(30) Foreign Application Priority Data
Jun. 22, 2017    (CN) .......................... 201710482722.9

(51) Int. Cl.
*H04W 8/24*    (2009.01)
*H04L 1/00*    (2006.01)
(Continued)

(52) U.S. Cl.
CPC .............. *H04W 8/24* (2013.01); *H04L 1/0038* (2013.01); *H04L 5/0082* (2013.01); *H04W 72/042* (2013.01); *H04W 72/0446* (2013.01)

(58) Field of Classification Search
CPC ... H04W 72/085; H04W 48/10; H04W 48/16; H04W 72/0413; H04W 76/27;
(Continued)

(56) References Cited

U.S. PATENT DOCUMENTS

2012/0263052 A1    10/2012    Dai et al.
2015/0117353 A1*    4/2015    Takeda ................ H04W 72/042
                                                              370/329

(Continued)

FOREIGN PATENT DOCUMENTS

CN    101790190 A    7/2010
CN    102056185 A    5/2011
(Continued)

OTHER PUBLICATIONS

1st Chinese Office Action for Chinese Application No. 201710482722.9, dated Nov. 26, 2019 (Nov. 26, 2019)—11 pages (English translation—14 pages).

(Continued)

*Primary Examiner* — Dady Chery
(74) *Attorney, Agent, or Firm* — Culhane Meadows PLLC; Stephen J. Weed

(57) ABSTRACT

The present disclosure provides a method for reporting a blind decoding capability, blind decoding configuration, a blind decoding method, a terminal and a base station. The method for reporting a blind decoding capability includes: determining the blind decoding capability information of the terminal, where the blind decoding capability information of the terminal include a maximum number of blind decodings that the terminal is capable to process per time unit; report- (Continued)

ing the blind decoding capability information of the terminal to a base station.

19 Claims, 6 Drawing Sheets

(51) Int. Cl.
*H04L 5/00* (2006.01)
*H04W 72/04* (2009.01)

(58) Field of Classification Search
CPC . H04W 24/08; H04W 72/1289; H04W 24/10; H04W 72/042; H04W 48/12; H04W 36/0079; H04W 8/24; H04W 72/0446; H04W 72/048; H04L 1/00; H04L 1/0045; H04L 1/0046; H04L 1/0072; H04L 5/00; H04L 1/0038; H04L 5/0053; H04L 5/0094; H04L 5/0082; H04L 1/0052; H04J 11/0073
See application file for complete search history.

(56) References Cited

U.S. PATENT DOCUMENTS

| | | | |
|---|---|---|---|
| 2015/0189628 A1 | 7/2015 | Pan et al. | |
| 2017/0374569 A1 | 12/2017 | Lee et al. | |
| 2018/0020443 A1* | 1/2018 | Lee | H04W 72/042 |

FOREIGN PATENT DOCUMENTS

| | | |
|---|---|---|
| CN | 102215586 A | 10/2011 |
| CN | 102368871 A | 3/2012 |
| CN | 103546233 A | 1/2014 |
| EP | 3247061 A1 | 11/2017 |
| WO | 2016114562 A1 | 7/2016 |

OTHER PUBLICATIONS

CATT: "Discussion on NR-PDCCH Monitoring," R1-1707496, 3GPP TSG RAN WG1 Meeting #89, Hangzhou, P.R. China, May 15, 2017, 4 pages.
Chinese Search Report for Chinese Application No. 201710482722.9, dated Apr. 16, 2019 (Apr. 16, 2019)—6 pages (English translation—5 pages).
Ericsson: "On Blind Decoding of NR-PDCCH" R1-1709068, 3GPP TSG RAN WG1 Meeting #89, Hangzhou, China, May 15, 2017, 3 pages.
Extended European Search Report for European Application No. 18819993.9, dated Jun. 3, 2020 (Jun. 3, 2020)—16 pages.
Huawei, HiSilicon: "Search Space Design," R1-1709952, 3GPP TSG RAN WG1 NR Ad Hoc Meeting, Qingdao, China, Jun. 27, 2017, 6 pages.
Huawei, HiSilicon: "UE procedure of PDCCH monitoring for URLLC" R1-1708122, 3GPP TSG RAN WG1 Meeting #898, Hangzhou, China, May 15, 2017, 3 pages.
International Search Report and Written Opinion for International Application No. PCT/CN2018/091036, dated Jan. 2, 2020 (Jan. 2, 2020)—9 pages (English translation—6 pages).
Lenovo: "Discussion on reducing the number of PDCCH blind decodings for Rel-13 eCA," R1-155814, 3GPP TSG RAN WG1 Meeting #82bis, Malmo, Sweden, Oct. 5, 2015, 2 pages.

* cited by examiner

METHOD FOR REPORTING BLIND DECODING CAPABILITY, BLIND DECODING CONFIGURATION, BLIND DECODING METHOD, TERMINAL AND BASE STATION

CROSS-REFERENCE TO RELATED APPLICATION

This application is the U.S. national phase of PCT Application PCT/CN2018/091036 filed on Jun. 13, 2018, which claims the benefit of Chinese Patent Application No. 201710482722.9, filed on Jun. 22, 2017, the disclosure of which is incorporated herein in its entirety by reference.

TECHNICAL FIELD

The present disclosure relates to the field of communication technologies, and in particular, to a method for reporting blind decoding capability, blind decoding configuration, a blind decoding method, a terminal and a base station.

BACKGROUND

In a LTE system, a terminal decodes a downlink control channel (PDCCH) sent by a base station using a blind decoding method to obtain downlink control information (DCI). The terminal performs blind decoding for the downlink control channel in each non-discontinuous reception (non-DRX) downlink subframe. The number of times the terminal performs the blind decoding for the PDCCH is related to parameters as follows:

1) DCI format types supported by the terminal at the same time, each DCI format type has a different DCI size. Taking the LTE as an example, the terminal blindly decodes two DCI format types, such as DCI format 1A and DCI format 2.

2) A PDCCH aggregation level blindly decoded by the terminal: in the LTE system, possible PDCCH aggregation levels include {1, 2, 4, 8, 16, 32}, and the terminal selects, based on a protocol or network configuration, all or part of the aggregate levels in the set for the blind decoding.

3) A PDCCH search space for the blind decoding performed by the terminal: the search space in the LTE system is defined as a series of Control Channel Element (CCE) resources required to be blindly decoded for each aggregation level, including a CCE starting position and the number of candidate resources.

Specifically, the blind decoding for the downlink control channel in the LTE system is described as follows:

In the LTE, the PDCCH is an instruction sent by the base station, and the terminal UE does not receive other information except some system information. As such, the UE does not know the number and locations of CCEs occupied by the UE, and a transmitted DCI format. Therefore, the decoding of the PDCCH belongs to blind decoding.

First, the UE determines which Downlink Control Indicator (DCI) format the PDCCH carries. For the DCI format, the UE expects to obtain a DCI according to a current state of the UE. For example, when the terminal is in an idle state, information that the terminal expects is paging system information (paging SI); when uplink data is ready to be transmitted, information that the terminal expects is uplink scheduling grant (UL Grant); after the terminal initiates random access, information that the terminal expects is a random access channel response (RACH Response). For different pieces of information, the UE uses a corresponding radio network temporary identifier RNTI to perform cyclic redundancy check (CRC check) with the CCE information. If the CRC check succeeds, the UE knows that the information is required by itself, and further decodes contents of the DCI according to modulation coding.

Second, if the UE traverses all CCEs once, the amount of computation may be large for the UE. Therefore, the LTE system divides available CCEs into two search spaces, i.e., a common search space and a UE-specific search space. Data transmitted in the common search space mainly includes messages such as system information, random access response RAR, and paging. Each user performs search. A location of the common search space is fixed, always at CCE 0-CCE 16. An aggregation level (AL) in the common search space includes 4 and 8. Thus, when a user searches in the common search space, the search is performed for 4 times starting from CCE 0 according to AL that is equal to 4. Then, the search is performed for 2 times according to AL that is equal to 8. For the UE-specific search space, a search starting point for each UE is different, and an AL of the search space is divided into 1, 2, 4, and 8. In this case, the search is performed for 6 times when the AL is 1, the search is performed for 6 times when the AL is 2, the search is performed for 2 times when the AL is 4, and the search is performed for 2 times when the AL is 8. The number of blind decodings performed by the UE may be calculated as follows: the number of search times of the common search space is 6, and the number of search times of the UE-specific search space is 16. In the UE-specific search space, a DCI format in which the UE is at the same time has two payload sizes, so it is necessary to search twice, that is, 32 times. When the UE performs blind decoding in the PDCCH search space, the UE attempts decoding a DCI that may occur, and does not match all DCI formats.

The terminal blind decoding is that the UE finds a starting position of the CCE, and intercepts, at the CCE starting position, a guessed DCI length for decoding. If the CRC of the decoded information bits is the same as the CRC carried in the PDCCH, the information bits carried by the current PDCCH is considered as downlink control information transmitted currently. Various RNTIs are implicit in the CRC.

During the design of 5G and Long Term Evolution (LTE), in order to make the channel design more flexible, the concept of terminal blind decoding is introduced. Specifically, the terminal performs various heuristic decoding through various assumptions without knowing information such as a physical resource position where a control signaling is located, the size of occupied resources, and the like, until the signaling is correctly decoded. In a 5G system, the downlink control channel blind decoding of the terminal is more complicated than the LTE system, which is described as follows:

1) An air interface (NR) system introduces the concept of multiple Control Channel Resource Set (Control Resource Set, CORESET), which is a set of time-frequency resources introduced by the NR. In other words, the terminal performs the blind decoding for the downlink control channel at a corresponding CORESET. And, the terminal may perform the blind decoding at multiple CORESETs at the same time.

In this case, the CORESET is composed of a set of Resource Element Group (REG). One downlink control channel (PDCCH) is composed of a group of CCEs, and one CCE is composed of a group of REGs. And the smallest unit (i.e., the control channel unit CCE) constituting one downlink control channel PDCCH may be centralized or distributed in the composition of physical resources (i.e., the composition of the REG).

A time-frequency position configuration of the CORESET may be informed through one or more of following combinations:

The time-frequency position configuration information of the CORESET may be informed through higher layer signaling; and/or, the time-frequency position configuration information of the CORESET may be passed through a broadcast channel, system information, etc.; and/or, the time-frequency position configuration information of the CORESET may be predefined based on, for example, one or more of system bandwidth, subcarrier spacing, antenna configuration, and carrier frequency.

2) The NR system introduces a variety of scheduling intervals in time, including a slot and a mini-slot. For a baseband parameter (numerology) configuration, one slot may include 7 or 14 orthogonal frequency division multiplexing (OFDM) symbols, and a mini-slot may include [1, 2, . . . slot_length−1] OFDM symbol. Based on network configuration, the terminal may perform the blind decoding for the downlink control channel taking the slot and/or the mini-slot as a time interval.

To support slot-based or mini-slot-based scheduling, the base station may configure the terminal to perform PDCCH monitoring according to the slot or the mini-slot as the time interval. As shown in FIG. 1, the terminal is configured by the network to perform slot-based PDCCH monitoring at the first OFDM symbol of each slot, and is configured by the network to perform mini-slot-based PDCCH monitoring at part of mini-slots, as shown in FIG. 1.

3) in order to enable the NR system to support different service types, such as enhanced mobile bandwidth (eMBB) and highly reliable communication (URLLC), the downlink control information (DCI) type that to be decoded by the terminal at the same time is potentially increased.

The power consumption and complexity of the receiving part of the terminal control channel are closely related to the number of blind decodings. Due to various reasons mentioned above, the PDCCH blind decoding in the NR system is more complicated than the LTE system. If an existing protocol is used to force all terminals to be configured with the same blind decoding capability, it is not able to adapt to diversified needs of services and terminal types.

SUMMARY

An embodiment of the present disclosure provides a method for reporting a blind decoding capability, applied to a terminal, including:

determining the blind decoding capability information of the terminal, wherein the blind decoding capability information of the terminal includes: a maximum number of blind decodings that the terminal is capable to process per time unit;

reporting the blind decoding capability information of the terminal to a base station.

An embodiment of the present disclosure provides a blind decoding configuration method, applied to a base station, including:

receiving blind decoding capability information of a terminal reported by the terminal, wherein the blind decoding capability information of the terminal includes: a maximum number of blind decodings that the terminal is capable to process per time unit;

configuring blind decoding information according to the blind decoding capability information of the terminal, and sending the blind decoding information to the terminal.

An embodiment of the present disclosure provides a blind decoding method, applied to a terminal, including:

determining blind decoding capability information of the terminal, wherein the blind decoding capability information of the terminal includes: a maximum number of blind decodings that the terminal is capable to process per time unit;

receiving blind decoding information configured by a base station;

if the total number of blind decodings per time unit determined by the terminal according to the blind decoding information configured by the base station is greater than the maximum number of blind decodings that the terminal is capable to process per time unit, reducing the number of blind decodings per time unit according to a preset rule, so that the total number of blind decodings per time unit is less than or equal to the maximum number of blind decodings that the terminal is capable to process per time unit;

performing blind decoding for a downlink control channel according to the reduced number of blind decodings.

An embodiment of the present disclosure provides a terminal, including:

a first determining module, configured to determine blind decoding capability information of the terminal, wherein the blind decoding capability information of the terminal includes: a maximum number of blind decodings that the terminal is capable to process per time unit; and a first reporting module, configured to report the blind decoding capability information of the terminal to a base station.

An embodiment of the present disclosure provides a terminal, including: a storage, a processor, and a computer program stored in the storage and executable by the processor, wherein the computer program is executed by the processor to implement the method for reporting a blind decoding capability described above.

An embodiment of the present disclosure provides a computer readable storage medium, storing a computer program, wherein the computer program is executed by a processor to implement the method for reporting a blind decoding capability described above.

An embodiment of the present disclosure provides a base station, including:

a first receiving module, configured to receive blind decoding capability information of a terminal reported by the terminal, wherein the blind decoding capability information of the terminal includes: a maximum number of blind decodings that the terminal is capable to process per time unit;

a configuration module, configured to configure blind decoding information according to the blind decoding capability information of the terminal, and send the blind decoding information to the terminal.

An embodiment of the present disclosure provides a base station, including: a storage, a processor, and a computer program stored in the storage and executable by the processor, wherein the computer program is executed by the processor to implement the blind decoding configuration method described above.

An embodiment of the present disclosure provides a computer readable storage medium, storing a computer program, wherein the computer program is executed by a processor to implement the blind decoding configuration method described above.

An embodiment of the present disclosure provides a terminal, including:

a second determining module, configured to determine blind decoding capability information of the terminal, wherein the blind decoding capability information of the terminal includes: the maximum number of blind decodings that the terminal is capable to process per time unit;

a second receiving module, configured to receive blind decoding information configured by a base station;

a number reducing module, configured to, if the total number of blind decodings per time unit determined by the terminal according to the blind decoding information configured by the base station is greater than the maximum number of blind decodings that the terminal is capable to process per time unit, reduce the number of blind decodings per time unit according to a preset rule, so that the total number of blind decodings per time unit is less than or equal to the maximum number of blind decodings that the terminal is capable to process per time unit;

a second blind decoding module, configured to perform blind decoding for a downlink control channel according to the reduced number of blind decodings.

An embodiment of the present disclosure provides a terminal, including: a storage, a processor, and a computer program stored in the storage and executable by the processor, wherein the computer program is executed by the processor to implement the blind decoding method described above.

An embodiment of the present disclosure provides a computer readable storage medium, storing a computer program, wherein the computer program is executed by a processor to implement the blind decoding method described above.

BRIEF DESCRIPTION OF THE DRAWINGS

In order to more clearly illustrate the technical solutions of the embodiments of the present disclosure, the drawings used in the description of the embodiments of the present disclosure will be briefly described. It is obvious that the drawings in the following description are some embodiments of the present disclosure. Other drawings may also be obtained by the person skilled in the art according to the following drawings without creative efforts.

DETAILED DESCRIPTION

The technical solutions in the embodiments of the present disclosure are clearly and completely described in the following with reference to the accompanying drawings in the embodiments of the present disclosure. It is obvious that the described embodiments are a part of the embodiments of the present disclosure, and not all of the embodiments. All other embodiments obtained by a person skilled in the art based on the embodiments of the present disclosure without creative efforts belong to the protection scope of the present disclosure.

Figure 1:
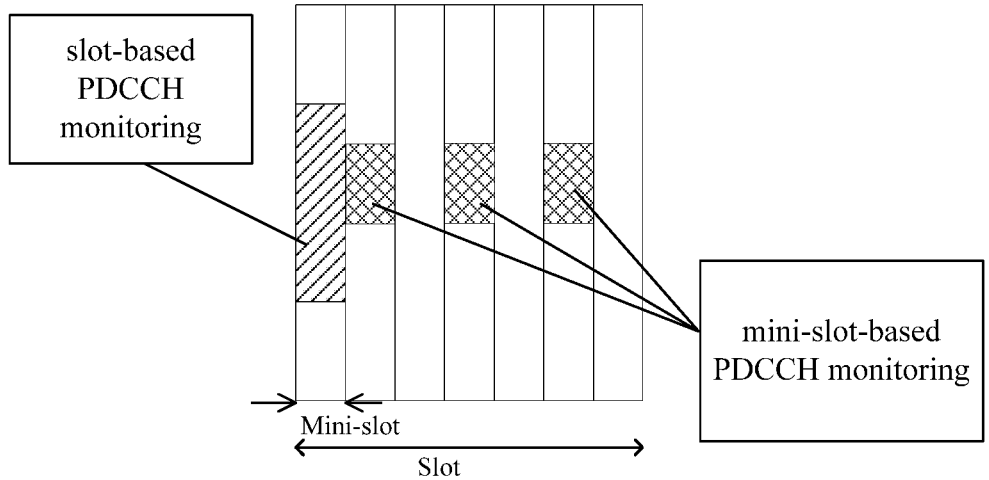
FIG. 1 is a schematic diagram illustrating slot-based PDCCH monitoring/mini-slot-based PDCCH monitoring in the related art.
Figure 2:
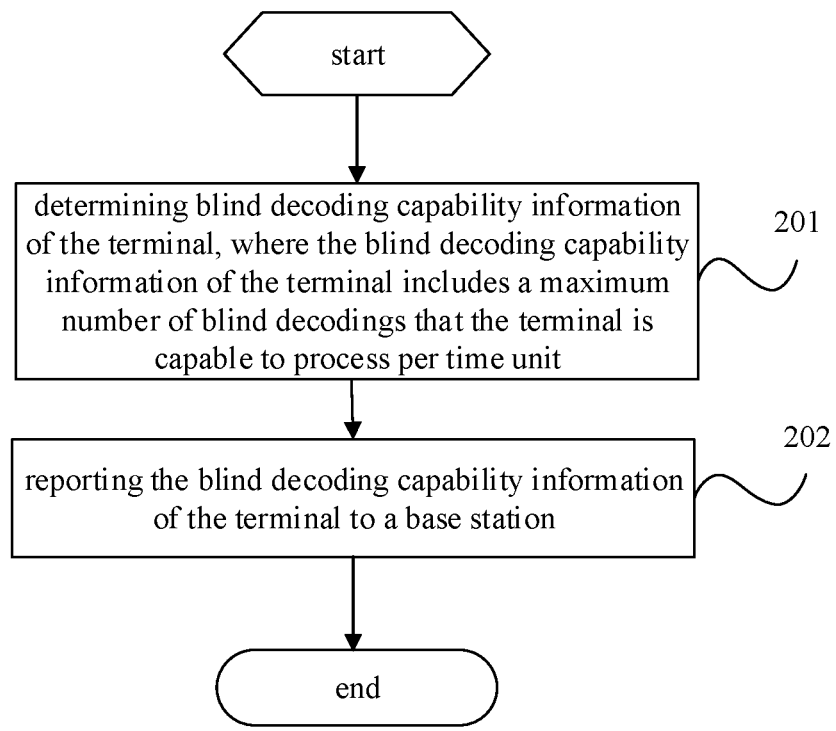
FIG. 2 is a first flowchart illustrating a method for reporting a blind decoding capability according to an embodiment of the present disclosure.

As shown in FIG. 2, an embodiment of the present disclosure provides a method for reporting a blind decoding capability, which is applied to a terminal. The method includes following operations.

In step 201, blind decoding capability information of the terminal is determined, in which the blind decoding capability information of the terminal includes: the maximum number of blind decodings that the terminal is capable to process per time unit.

It should be noted that the blind decoding capability information of the terminal specifically refers to blind decoding capability information of the terminal for a downlink control channel (PDCCH). The blind decoding capability information is determined by the terminal. The terminal may determine blind decoding capability information of different terminals according to different services or cost requirements of the different terminal. Specifically, the blind decoding capability information of the terminal is defined as the maximum number of blind decodings that the terminal is capable to process per time unit.

In step 202, the blind decoding capability information of the terminal is reported to a base station.

It should be noted that the terminal reports the blind decoding capability information to the base station (or a network) to assist the base station to perform a reasonable blind decoding configuration on a blind decoding behavior (the blind decoding behavior specifically refers to a blind decoding behavior for a downlink control channel PDCCH) of the terminal according to the blind decoding capability information of the terminal.

Optionally, the method for reporting the blind decoding capability is specifically applied to a 5G system, such as an NR system, an LTE-A system, etc., which is not specifically limited herein.

Figure 3:
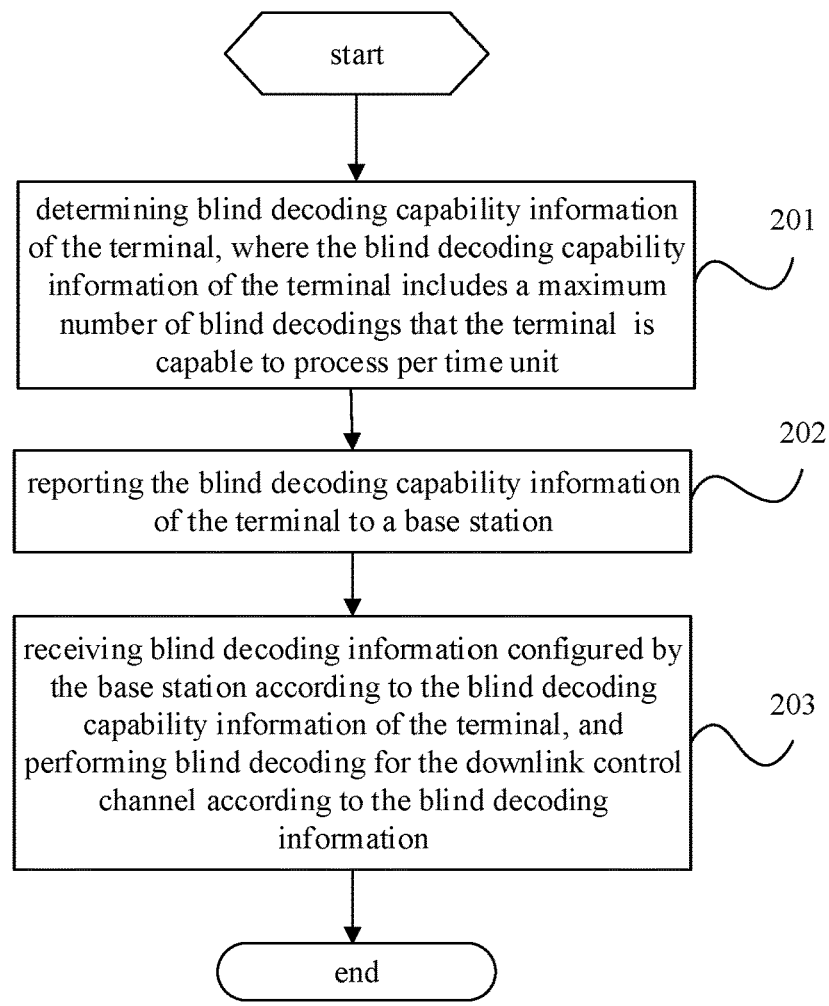
FIG. 3 is a second flowchart illustrating a method for reporting a blind decoding capability according to an embodiment of the present disclosure.

Further, as shown in FIG. 3, in the foregoing embodiment of the present disclosure, after the step 202, the method further includes operations as follows.

In step 203, blind decoding information configured by the base station according to the blind decoding capability information of the terminal is received, and blind decoding for the downlink control channel is performed according to the blind decoding information.

It should be noted that, the terminal may determine, according to the blind decoding information configured by the base station, the number of blind decodings configured by the base station and at which position, which type of uplink control information is blindly decoded. Generally, the total number of blind decodings per time unit configured by the base station is less than or equal to the maximum number of blind decodings that the terminal is capable to process per time unit. However, there are also special cases. For example, multiple base stations simultaneously perform configuration on the blind decoding behavior of the terminal, the total number of blind decodings per time unit configured by the base stations may be greater than the maximum number of blind decodings that the terminal is capable to process per time unit. For another example, when one base station performs configuration on the blind decoding behavior of the terminal, the total number of blind decodings per time unit configured by the base station may be greater than the maximum number of blind decodings that the terminal is capable to process per time unit due to impacts of other factors. As such, the total number of blind decodings per time unit configured by the base station is not specifically limited in the embodiment of the present disclosure.

Specifically, in the foregoing embodiment of the present disclosure, the time unit is one slot or multiple slots. Alternatively, the time unit is one subframe or multiple subframes. Alternatively, the time unit is one mini-slot or multiple mini-slots. Alternatively, the time unit is a preset time period (the preset time period may be an absolute time unit, such as 1 ms, 2 ms, etc.). Alternatively, the time unit is one transmission time interval (TTI) or multiple TTIs.

Specifically, in the above embodiment of the present disclosure, the maximum number of blind decodings is the sum of the number of blind decodings with one blind decoding type or multiple blind decoding types.

The blind decoding type includes: blind decoding for a downlink control channel based on a common search space, blind decoding for a downlink control channel based on a UE specific search space taking a slot length as a time interval, and/or blind decoding for a downlink control channel based on the UE specific search space taking a mini-slot length as the time interval.

In each blind decoding type, the number of blind decodings includes: the number of times the terminal decodes at least one type of downlink control information in at least one candidate resource of at least one control resource set.

It should be noted that the terminal may perform the blind decoding for the PDCCH at one control resource set or multiple control resource sets; and/or, the terminal may perform the blind decoding for the PDCCH at one candidate resource or candidate resources; and/or, the terminal may decode one type of DCI or a plurality of types of DCI. The number of the control resource sets, the number of the candidate resources, and the type of the DCI may be configured by the base station.

Optionally, the step 201 in the foregoing embodiment of the disclosure includes:

determining the blind decoding capability information of the terminal at different aggregation levels of the downlink control channel, respectively; in which the terminal has the same blind decoding capability information at the different aggregation levels of the downlink control channel, or the terminal has different blind decoding capability information at the different aggregation levels of the downlink control channel.

If the terminal has the same blind decoding capability information at the different aggregation levels of the downlink control channel, i.e., the blind decoding capability of the terminal is not related to the aggregation level of the PDCCH, the aggregation levels of the PDCCH are not distinguished, and the blind decoding capability at the different aggregation levels is treated as the same.

If the terminal has different blind decoding capability information at the different aggregation levels of the downlink control channel, i.e., the blind decoding capability of the terminal is related to the aggregation level of the PDCCH, the aggregation levels of the PDCCH are distinguished, and the blind decoding capability is defined as blind decoding capability supported by one or more PDCCH aggregation levels. For example, the blind decoding capability information of the terminal for a PDCCH of which an aggregation level is 1 is: the maximum number of blind decodings performed by the terminal per time unit for the PDCCH of which the aggregation level is 1 is 100; the blind decoding capability information of the terminal for a PDCCH of which an aggregation level is 2 is: the maximum number of blind decodings performed by the terminal per time unit for the PDCCH of which the aggregation level is 2 is 80.

It should be noted that when the blind decoding capability of the terminal is related to the aggregation level of the PDCCH, it is not limited that different aggregation levels correspond to different aggregation capabilities. Multiple aggregation levels may be configured with the same aggregation capability, but not all aggregation levels are configured with the same aggregation capability. For example, the terminal has the same blind decoding capability for PDCCHs of which the aggregation level is 1, 2, and 4, respectively, which is set as 100; and the terminal has the same blind decoding capability for PDCCHs of which the aggregation level is 8, 16, and 32, respectively, which is set as 200. In this case, it is also considered that the blind decoding capability of the terminal is related to the aggregation level of the PDCCH.

Further, if the terminal has different blind decoding capability information at different aggregation levels of the downlink control channel, the step 202 of the embodiment of the present disclosure includes:

reporting the blind decoding capability information of the terminal at the different aggregation levels of the downlink control channel to the base station.

Specifically, the terminal separately reports the blind decoding capability information at the different aggregation levels. For example, the contents reported by the terminal may include: the blind decoding capability information of the terminal for the PDCCH of which the aggregation level is 1 and the blind decoding capability information of the terminal for the PDCCH of which the aggregation level is 2. The blind decoding capability information of the terminal for the PDCCH of which the aggregation level is 1 is: the maximum number of blind decodings performed by the terminal per time unit for the PDCCH of which the aggregation level is 1 is 100. The blind decoding capability information of the terminal for the PDCCH of which the aggregation level is 2 is: the maximum number of blind decodings performed by the terminal per time unit for the PDCCH of which the aggregation level is 2 is 80.

In summary, in the method for reporting the blind decoding capability provided by the foregoing embodiment of the present disclosure, the terminal independently reports its own blind decoding capability information to assist the base station to perform a reasonable blind decoding configuration according to the blind decoding capability information, thereby adapting to various demands for services and the variety of terminal types.

Figure 4:
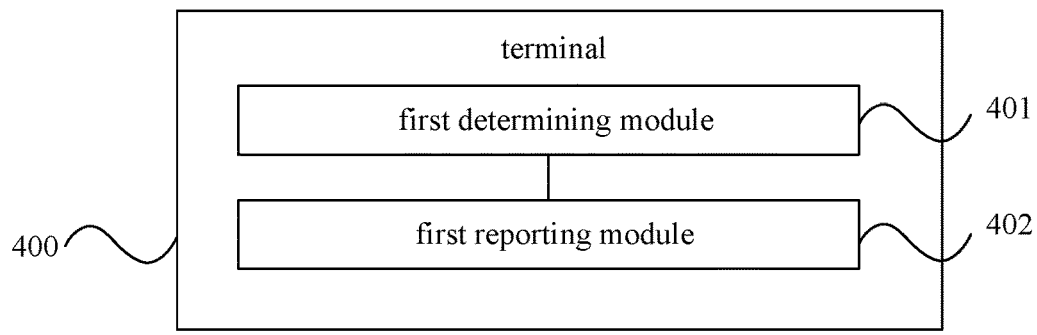
FIG. 4 is a first schematic diagram illustrating a terminal according to an embodiment of the present disclosure.

As shown in FIG. 4, an embodiment of the present disclosure further provides a terminal 400, including:

a first determining module 401, configured to determine blind decoding capability information of the terminal, in which the blind decoding capability information of the terminal includes: the maximum number of blind decodings that the terminal is capable to process per time unit; and a first reporting module 402, configured to report the blind decoding capability information of the terminal to a base station.

Figure 5:
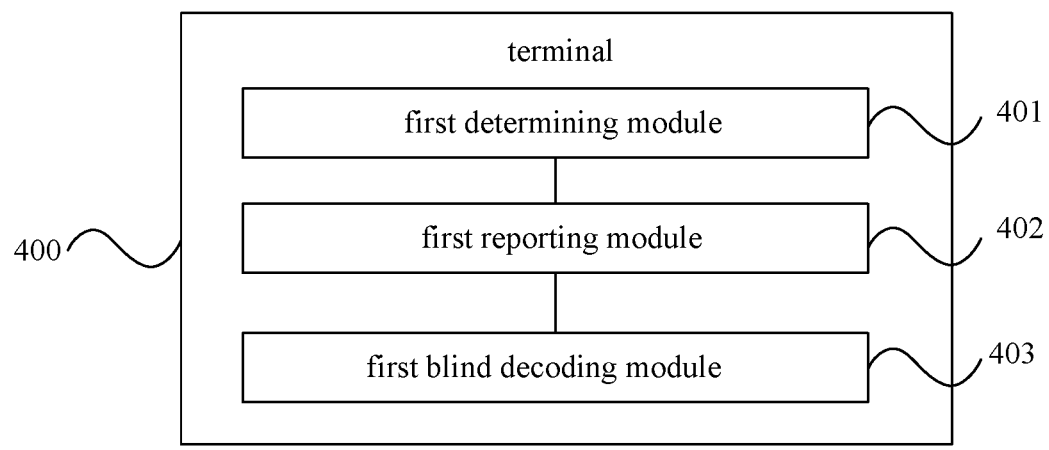
FIG. 5 is a second schematic diagram illustrating a terminal according to an embodiment of the present disclosure.

Further, as shown in FIG. 5, the terminal further includes:

a first blind decoding module 403, configured to receive blind decoding information configured by the base station according to the blind decoding capability information of the terminal, and perform blind decoding for a downlink control channel according to the blind decoding information.

Further, the time unit is one slot or multiple slots. Alternatively, the time unit is one subframe or multiple subframes. Alternatively, the time unit is one mini-slot or multiple mini-slots. Alternatively, the time unit is a preset time period. Alternatively, the time unit is one TTI or multiple TTIs.

Further, the maximum number of blind decodings is the sum of the number of blind decodings with one blind decoding type or multiple blind decoding types.

Further, the number of blind decodings includes: the number of times the terminal decodes at least one type of downlink control information in at least one candidate resource of at least one control resource set.

Further, the blind decoding type includes: blind decoding for a downlink control channel based on a common search space, blind decoding for a downlink control channel based on a UE specific search space taking a slot length as a time interval, and/or blind decoding for a downlink control channel based on the UE specific search space taking a mini-slot length as the time interval.

Further, the first determining module includes:

a first determining submodule, configured to determine the blind decoding capability information of the terminal at different aggregation levels of the downlink control channel, respectively; in which the terminal has the same blind decoding capability information at the different aggregation levels of the downlink control channel, or the terminal has different blind decoding capability information at the different aggregation levels of the downlink control channel.

Further, the first reporting module includes:

a first reporting submodule, configured to report the blind decoding capability information of the terminal at the different aggregation levels of the downlink control channel to the base station if the terminal has different blind decoding capability information at different aggregation levels of the downlink control channel.

In summary, in the terminal provided by the foregoing embodiment of the present disclosure, the terminal independently reports its own blind decoding capability information to assist the base station to perform a reasonable blind decoding configuration according to the blind decoding capability information, thereby adapting to various demands for services and the variety of terminal types.

It should be noted that the terminal provided by the embodiment of the present disclosure is a terminal corresponding to the above-described method for reporting the capability of the terminal. All implementation manners of the foregoing embodiments are applicable to the terminal embodiment, and the same technical effects can be achieved.

An embodiment of the present disclosure also provides a terminal, including: a storage, a processor, and a computer program stored in the storage and executable by the processor. The computer program may be executed by the processor to implement various processes in the embodiments of the method for reporting a blind decoding capability, and the same technical effects may be achieved. To avoid repetition, no further details are provided herein.

An embodiment of the present disclosure further provides a computer readable storage medium, in which the computer readable storage medium stores a computer program. The computer program may be executed by a processor to implement various processes in the embodiments of the method for reporting a blind decoding capability, and the same technical effects may be achieved. To avoid repetition, no further details are provided herein. The computer readable storage medium may be a read-only memory (ROM), a random access memory (RAM), a magnetic disk, or an optical disk.

Figure 6:
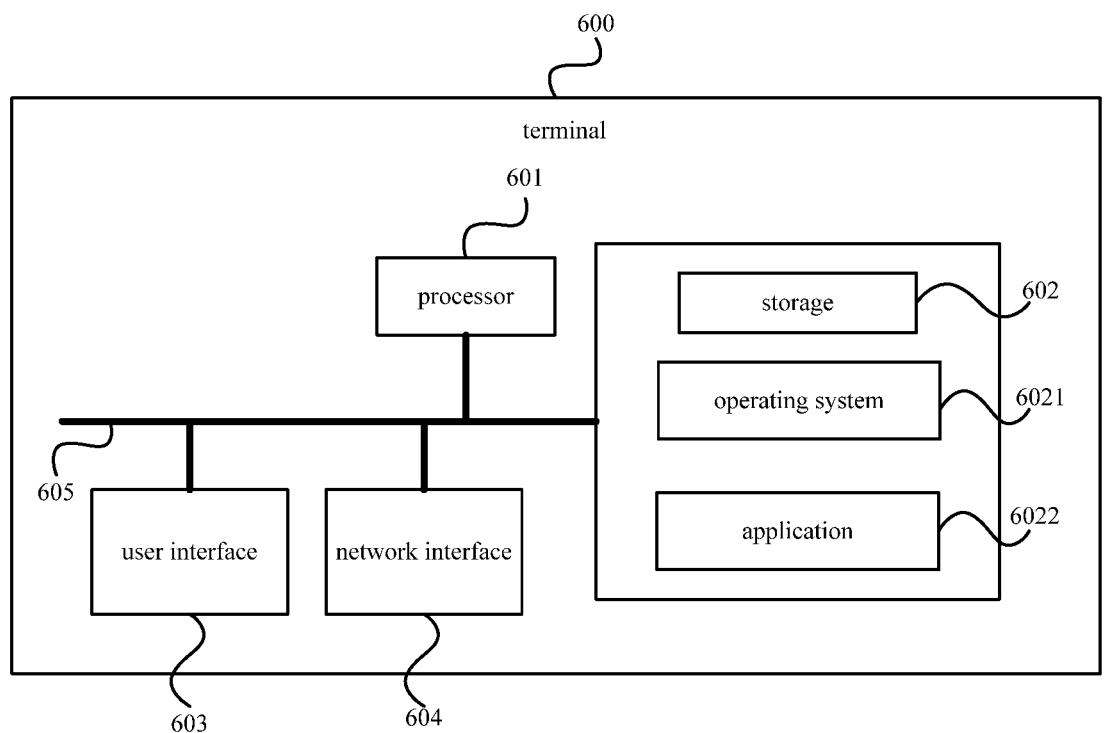
FIG. 6 is a third schematic diagram illustrating a terminal according to an embodiment of the present disclosure.

FIG. 6 is a schematic diagram illustrating a terminal according to an embodiment of the present disclosure. An application entity of the method for reporting a blind decoding capability provided by the present disclosure will be specifically described below in conjunction with FIG. 6.

A terminal 600 as shown in FIG. 6 includes at least one processor 601, a storage 602, at least one network interface 604, and a user interface 603. The various components in terminal 600 are coupled together by a bus system 605. It can be understood that the bus system 605 is used to implement connection communication between these components. The bus system 605 includes a power bus, a control bus, and a status signal bus in addition to a data bus. However, for clarity of description, various buses are labeled as bus system 605 in FIG. 6.

The user interface 603 may include a display, a keyboard, or a clicking device (e.g., a mouse, a track ball, a touch pad, or a touch screen, etc.).

It can be understood that the storage 602 in the embodiment of the present disclosure may be a volatile storage or a non-volatile storage, or may include both volatile and non-volatile storage. The non-volatile storage may be a read-only memory (ROM), a programmable ROM (PROM), an Erasable PROM (EPROM), an Electrically EPROM (EEPROM), or a flash memory. The volatile storage may be a Random Access Memory (RAM) that acts as an external cache. By way of example and not limitation, many forms of RAM are available, such as static RAM (SRAM), dynamic RAM (DRAM), synchronous DRAM (SDRAM), Double Data Rate SDRAM (DDRSDRAM), Enhanced SDRAM (ESDRAM), Synchlink DRAM (SLDRAM) and direct rambus RAM (DRRAM). The storage 602 of the systems and methods described herein is intended to include, without being limited to, these and any other suitable types of storage.

In some embodiments, the storage 602 stores elements such as executable modules or data structures, or a subset thereof, or an extended set thereof: an operating system 6021 and an application 6022.

The operating system 6021 includes various system programs, such as a framework layer, a core library layer, a driver layer, and the like, for implementing various basic services and processing hardware-based tasks. The application 6022 includes various applications, such as a Media Player, a Browser, etc., for implementing various application services. A program implementing the method of the embodiments of the present disclosure may be included in the application 6022.

In the embodiment of the present disclosure, through calling a program or an instruction stored in the storage 602, which may be a program or an instruction stored in the application 6022, the processor 601 is to: determine blind decoding capability information of the terminal, in which the blind decoding capability information of the terminal includes: the maximum number of blind decodings that the terminal is capable to process per time unit; and report the blind decoding capability information of the terminal to a base station.

The method disclosed in the above embodiments of the present disclosure may be applied to the processor 601 or implemented by the processor 601. The processor 601 may be an integrated circuit chip with signal processing capabilities. In the implementation process, each step of the above method may be implemented by an integrated logic circuit of hardware in the processor 601 or an instruction in a form of software. The processor 601 may be a general-purpose processor, a digital signal processor (DSP), an application specific integrated circuit (ASIC), a field programmable gate array (FPGA), or like programming logic devices, discrete gates or transistor logic devices, discrete hardware components. The methods, steps, and logical block diagrams disclosed in the embodiments of the present disclosure may be implemented or carried out. The general-purpose processor may be a microprocessor or any conventional processor. The steps of the method disclosed in the embodiments of the present disclosure may be directly implemented by the hardware decoding processor, or may be implemented by a combination of hardware and software modules in the decoding processor. The software modules may be located in a conventional storage medium such as random access memory, flash memory, read only memory, programmable read only memory or electrically erasable programmable memory, registers, and the like. A storage medium is located in the storage 602. The processor 601 reads the information in the storage 602 and implements the steps of the above method in combination with its hardware.

It can be understood that the embodiments described herein may be implemented in hardware, software, firmware, middleware, microcode, or a combination thereof. For hardware implementation, the processing unit may be implemented in one or more Application Specific Integrated Circuits (ASICs), Digital Signal Processing (DSP), Digital Signal Processing Device (DSP Device, DSPD), programmable Logic Device (PLD), Field-Programmable Gate Array (FPGA), general-purpose processor, controller, microcontroller, microprocessor, other electronic unit for performing the functions described herein or a combination thereof.

For a software implementation, the techniques described herein may be implemented by modules (e.g., procedures, functions, and so on) that perform the functions described herein. The software code may be stored in the storage and executed by the processor. The storage may be implemented inside the processor or outside the processor.

Optionally, in another embodiment of the present disclosure, the processor 601 is to receive blind decoding information configured by the base station according to the blind decoding capability information of the terminal, and perform blind decoding for the downlink control channel according to the blind decoding information.

Optionally, in another embodiment of the present disclosure, the time unit is one slot or multiple slots. Alternatively, the time unit is one subframe or multiple subframes. Alternatively, the time unit is one mini-slot or multiple mini-slots. Alternatively, the time unit is a preset time period. Alternatively, the time unit is one TTI or multiple TTIs.

Optionally, as another embodiment of the present disclosure, the maximum number of blind decodings is the sum of the number of blind decodings with one blind decoding type or multiple blind decoding types.

Optionally, as another embodiment of the present disclosure, the number of blind decodings includes: the number of times the terminal decodes at least one type of downlink control information in at least one candidate resource of at least one control resource set.

Optionally, as another embodiment of the present disclosure, the blind decoding type includes: blind decoding for a downlink control channel based on a common search space, blind decoding for a downlink control channel based on a UE specific search space taking a slot length as a time interval, and/or blind decoding for a downlink control channel based on the UE specific search space taking a mini-slot length as the time interval.

Optionally, as another embodiment of the present disclosure, the process 601 is to: determine the blind decoding capability information of the terminal at different aggregation levels of the downlink control channel, respectively; in which the terminal has the same blind decoding capability information at the different aggregation levels of the downlink control channel, or the terminal has different blind decoding capability information at the different aggregation levels of the downlink control channel.

Optionally, as another embodiment of the present disclosure, the process 601 is to: report the blind decoding capability information of the terminal at the different aggregation levels of the downlink control channel to the base station if the terminal has different blind decoding capability information at different aggregation levels of the downlink control channel.

The terminal 600 may implement various processes implemented by the terminal in the above-described embodiments. To avoid repetition, no further details are provided herein.

In summary, in the terminal provided by the foregoing embodiment of the present disclosure, the terminal independently reports its own blind decoding capability information to assist the base station to perform a reasonable blind decoding configuration according to the blind decoding capability information, thereby adapting to various demands for services and the variety of terminal types.

It should be noted that the terminal provided by the embodiment of the present disclosure is a terminal corresponding to the above-described method for reporting the capability of the terminal. All implementation manners of the foregoing embodiments are applicable to the terminal embodiment, and the same technical effects can be achieved.

Figure 7:
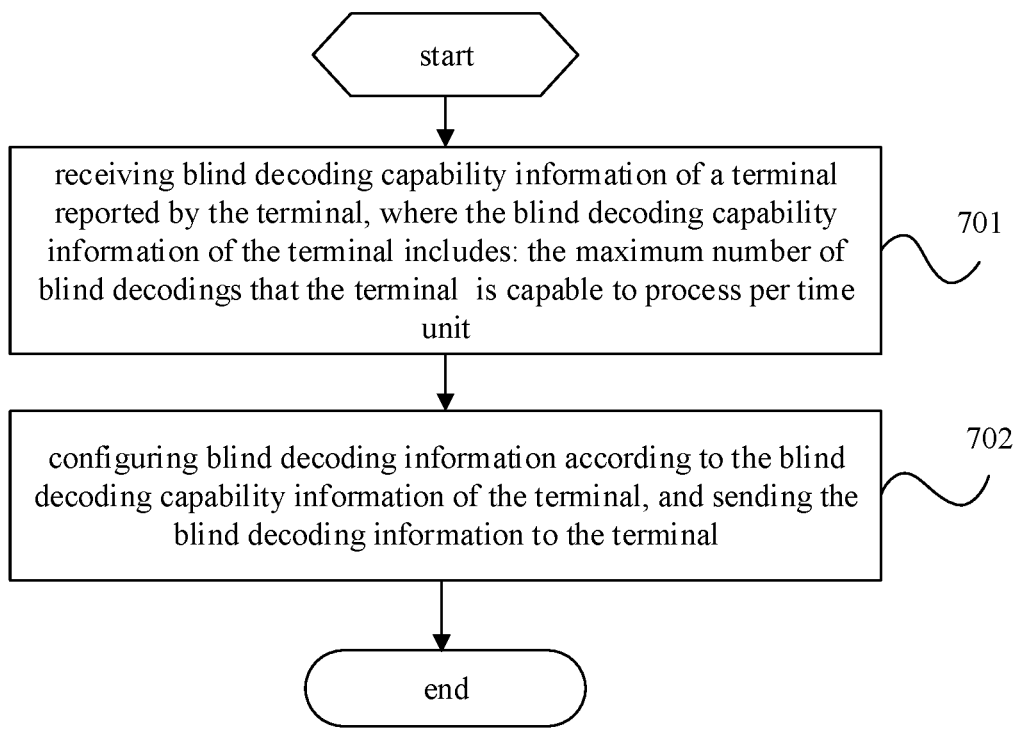
FIG. 7 is a flowchart illustrating a blind decoding configuration method according to an embodiment of the present disclosure.

As shown in FIG. 7, an embodiment of the present disclosure provides a blind decoding configuration method, applied to a base station, including following operations.

In step 701, blind decoding capability information of a terminal reported by the terminal is received, in which the blind decoding capability information of the terminal includes: the maximum number of blind decodings that the terminal is capable to process per time unit.

It should be noted that the blind decoding capability information of the terminal specifically refers to blind decoding capability information of the terminal for a downlink control channel (PDCCH). The blind decoding capability information is determined by the terminal. The terminal may determine blind decoding capability information of different terminals according to different services or cost requirements of the different terminal. Specifically, the blind decoding capability information of the terminal is defined as the maximum number of blind decodings that the terminal is capable to process per time unit.

In step 702, blind decoding information is configured according to the blind decoding capability information of the terminal, and the blind decoding information is sent to the terminal.

It should be noted that, after the base station receives the blind decoding capability information reported by the terminal, the base station perform a reasonable blind decoding configuration for the blind decoding behavior (the blind decoding behavior specifically refers to a blind decoding behavior for a downlink control channel PDCCH) of the terminal.

Generally, the total number of blind decodings per time unit configured by the base station is less than or equal to the maximum number of blind decodings that the terminal is capable to process per time unit. However, there are also special cases. For example, multiple base stations simultaneously perform configuration on the blind decoding behavior of the terminal, the total number of blind decodings per time unit configured by the base stations may be greater than the maximum number of blind decodings that the terminal is capable to process per time unit. For another example, when one base station performs configuration on the blind decoding behavior of the terminal, the total number of blind decodings per time unit configured by the base station may be greater than the maximum number of blind decodings that the terminal is capable to process per time unit due to impacts of other factors. As such, the total number of blind decodings per time unit configured by the base station is not specifically limited in the embodiment of the present disclosure.

Specifically, in the foregoing embodiment of the present disclosure, the time unit is one slot or multiple slots. Alternatively, the time unit is one subframe or multiple subframes. Alternatively, the time unit is one mini-slot or multiple mini-slots. Alternatively, the time unit is a preset time period (the preset time period may be an absolute time unit, such as 1 ms, 2 ms, etc.). Alternatively, the time unit is one transmission time interval (TTI) or multiple TTIs.

Specifically, in the above embodiment of the present disclosure, the maximum number of blind decodings is the sum of the number of blind decodings with one blind decoding type or multiple blind decoding types.

The blind decoding type includes: blind decoding for a downlink control channel based on a common search space, blind decoding for a downlink control channel based on a UE specific search space taking a slot length as a time interval, and/or blind decoding for a downlink control channel based on the UE specific search space taking a mini-slot length as the time interval.

In each blind decoding type, the number of blind decodings includes: the number of times the terminal decodes at least one type of downlink control information in at least one candidate resource of at least one control resource set.

It should be noted that the terminal may perform the blind decoding for the PDCCH at one control resource set or multiple control resource sets; and/or, the terminal may perform the blind decoding for the PDCCH at one candidate resource or candidate resources; and/or, the terminal may decode one type of DCI or a plurality of types of DCI. The number of the control resource sets, the number of the candidate resources, and the type of the DCI may be configured by the base station.

Specifically, in the foregoing embodiment of the present disclosure, the step 702 includes:

configuring, according to the blind decoding capability information of the terminal, blind decoding information with at least one blind decoding type for the blind decoding behavior of the terminal.

For example, the blind decoding capability information reported by the terminal is that the maximum number of blind decodings supported by the terminal within per time unit 1 ms may be 100, and the base station may configure the terminal to perform blind decoding as follows:

1) The blind decoding for a downlink control channel based on a common search space (common PDCCH): 20 candidate resources, a total number of blind decodings is 20;

2) The blind decoding for a downlink control channel based on a UE specific search space taking a slot as a time interval (a slot length is 1 ms): the DCI type of the blind decoding includes: two control resource sets (CORESET) A and B, each control resource set includes 10 candidate resources, a total number of blind decodings is 2×2×10=40;

3) The blind decoding for a downlink control channel based on the UE specific search space taking a mini-slot as the time interval: the DCI type of the blind decoding is C, one control resource set (CORESET), and 7 mini-slots are blindly decoded within each slot (a slot length is 1 ms), each mini-slot includes 5 candidate resources, a total number of blind decodings is 7×5×1×1=35.

In view of the above, according to the configuration of the base station, a total number of blind decodings performed by the terminal within 1 ms is 20+40+35=95, which does not exceed the maximum number of blind decodings performed by the terminal within the time unit.

In summary, in the blind decoding configuration method provided by the foregoing embodiment of the present disclosure, the terminal independently reports its own blind decoding capability information, the base station performs a reasonable blind decoding configuration according to the blind decoding capability information of the terminal after receiving the blind decoding capability information of the terminal, thereby adapting to various demands for services and the variety of terminal types.

Figure 8:
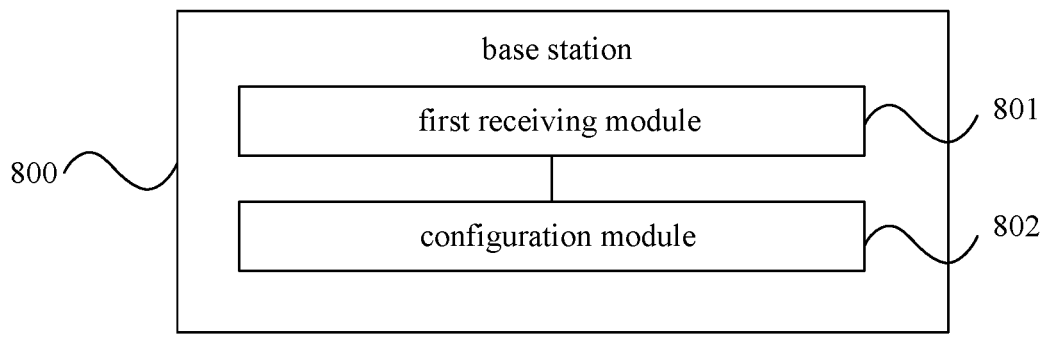
FIG. 8 is a first schematic diagram illustrating a base station according to an embodiment of the present disclosure.

As shown in FIG. 8, an embodiment of the present disclosure further provides a base station 800, includes:

a first receiving module 801, configured to receive blind decoding capability information of a terminal reported by the terminal, in which the blind decoding capability information of the terminal includes: the maximum number of blind decodings that the terminal is capable to process per time unit;

a configuration module 802, configured to configure blind decoding information according to the blind decoding capability information of the terminal, and send the blind decoding information to the terminal.

Further, the time unit is one slot or multiple slots. Alternatively, the time unit is one subframe or multiple subframes. Alternatively, the time unit is one mini-slot or multiple mini-slots. Alternatively, the time unit is a preset time period (the preset time period may be an absolute time unit, such as 1 ms, 2 ms, etc.). Alternatively, the time unit is one transmission time interval (TTI) or multiple TTIs.

Further, the maximum number of blind decodings is the sum of the number of blind decodings with one blind decoding type or multiple blind decoding types.

Further, the number of blind decodings includes: the number of times the terminal decodes at least one type of downlink control information in at least one candidate resource of at least one control resource set.

Further, the blind decoding type includes: blind decoding for a downlink control channel based on a common search space, blind decoding for a downlink control channel based on a UE specific search space taking a slot length as a time interval, and/or blind decoding for a downlink control channel based on the UE specific search space taking a mini-slot length as the time interval.

Further, the configuration module includes:

a configuration submodule, configured to configure, according to the blind decoding capability information of the terminal, blind decoding information with at least one blind decoding type for the blind decoding behavior of the terminal.

In summary, in the base station provided by the foregoing embodiment of the present disclosure, the base station performs a reasonable blind decoding configuration according to the blind decoding capability information of the terminal after receiving the blind decoding capability information of the terminal, thereby adapting to various demands for services and the variety of terminal types.

It should be noted that the base station provided by the embodiment of the present disclosure is a base station corresponding to the above-described blind decoding configuration method. All implementation manners of the foregoing embodiments are applicable to the base station embodiment, and the same technical effects can be achieved.

An embodiment of the present disclosure also provides a base station, including: a storage, a processor, and a computer program stored in the storage and executable by the processor. The computer program may be executed by the processor to implement various processes in the embodiments of the blind decoding configuration method, and the same technical effects may be achieved. To avoid repetition, no further details are provided herein.

An embodiment of the present disclosure further provides a computer readable storage medium, in which the computer readable storage medium stores a computer program. The computer program may be executed by a processor to implement various processes in the embodiments of the blind decoding configuration method, and the same technical effects may be achieved. To avoid repetition, no further details are provided herein. The computer readable storage medium may be a read-only memory (ROM), a random access memory (RAM), a magnetic disk, or an optical disk.

Figure 9:
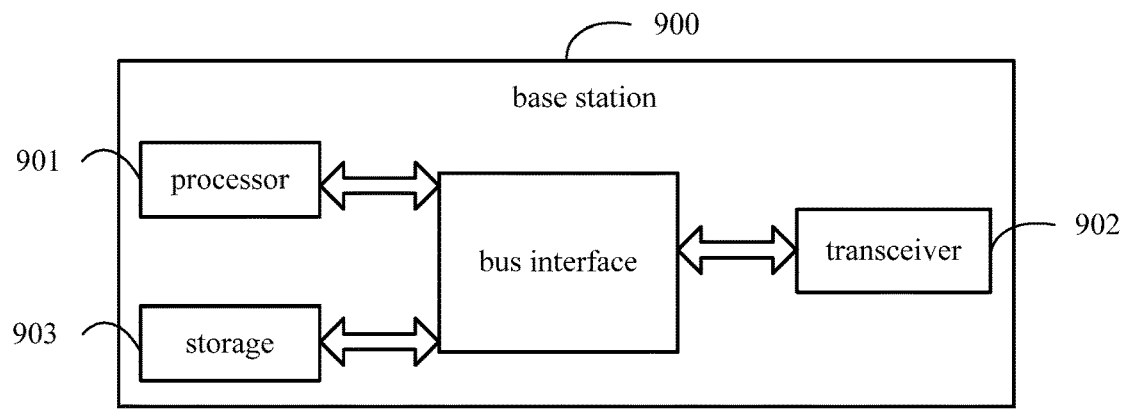
FIG. 9 is a second schematic diagram illustrating a base station according to an embodiment of the present disclosure.

FIG. 9 is a schematic diagram illustrating a base station according to an embodiment of the present disclosure, which may implement the above details of the blind decoding configuration method applied to the base station side, and achieve the same effects. As shown in FIG. 9, the base station 900 includes a processor 901, a transceiver 902, a storage 903, and a bus interface, in which:

the processor 901 is configured to read a program in the storage 903 to perform operations as follows:

receiving, through the transceiver 902, blind decoding capability information of a terminal reported by the terminal, in which the blind decoding capability information of the terminal includes: the maximum number of blind decodings that the terminal is capable to process per time unit; configure blind decoding information according to the blind decoding capability information of the terminal; and send the blind decoding information to the terminal through the transceiver 902.

In FIG. 9, the bus architecture may include any number of interconnected buses and bridges, specifically linked by various circuits of one or more processors represented by the processor 901 and a storage represented by the storage 903. The bus architecture may also link various other circuits such as peripherals, voltage regulators, and power management circuits, which are well known in the art and, therefore, will not be further described herein. The bus interface provides an interface. The transceiver 902 may be a plurality of components, including a transmitter and a receiver, providing a unit for communicating with various other devices on a transmission medium.

The processor 901 is responsible for managing the bus architecture and general processing, and the storage 903 may store data used by the processor 901 when performing operations.

Specifically, the time unit is one slot or multiple slots. Alternatively, the time unit is one subframe or multiple subframes. Alternatively, the time unit is one mini-slot or multiple mini-slots. Alternatively, the time unit is a preset time period (the preset time period may be an absolute time unit, such as 1 ms, 2 ms, etc.). Alternatively, the time unit is one transmission time interval (TTI) or multiple TTIs.

Specifically, the maximum number of blind decodings is the sum of the number of blind decodings with one blind decoding type or multiple blind decoding types.

Specifically, the number of blind decodings includes: the number of times the terminal decodes at least one type of downlink control information in at least one candidate resource of at least one control resource set.

Specifically, the blind decoding type includes: blind decoding for a downlink control channel based on a common search space, blind decoding for a downlink control channel based on a UE specific search space taking a slot length as a time interval, and/or blind decoding for a downlink control channel based on the UE specific search space taking a mini-slot length as the time interval.

Optionally, the processor 901 reads the program in the storage 903 to perform operations as follows:

configuring, according to the blind decoding capability information of the terminal, blind decoding information with at least one blind decoding type for the blind decoding behavior of the terminal.

In summary, in the base station provided by the foregoing embodiment of the present disclosure, the base station performs a reasonable blind decoding configuration according to the blind decoding capability information of the terminal after receiving the blind decoding capability information of the terminal, thereby adapting to various demands for services and the variety of terminal types.

It should be noted that the base station provided by the embodiment of the present disclosure is a base station corresponding to the above-described blind decoding configuration method. All implementation manners of the foregoing embodiments are applicable to the base station embodiment, and the same technical effects can be achieved.

Figure 10:
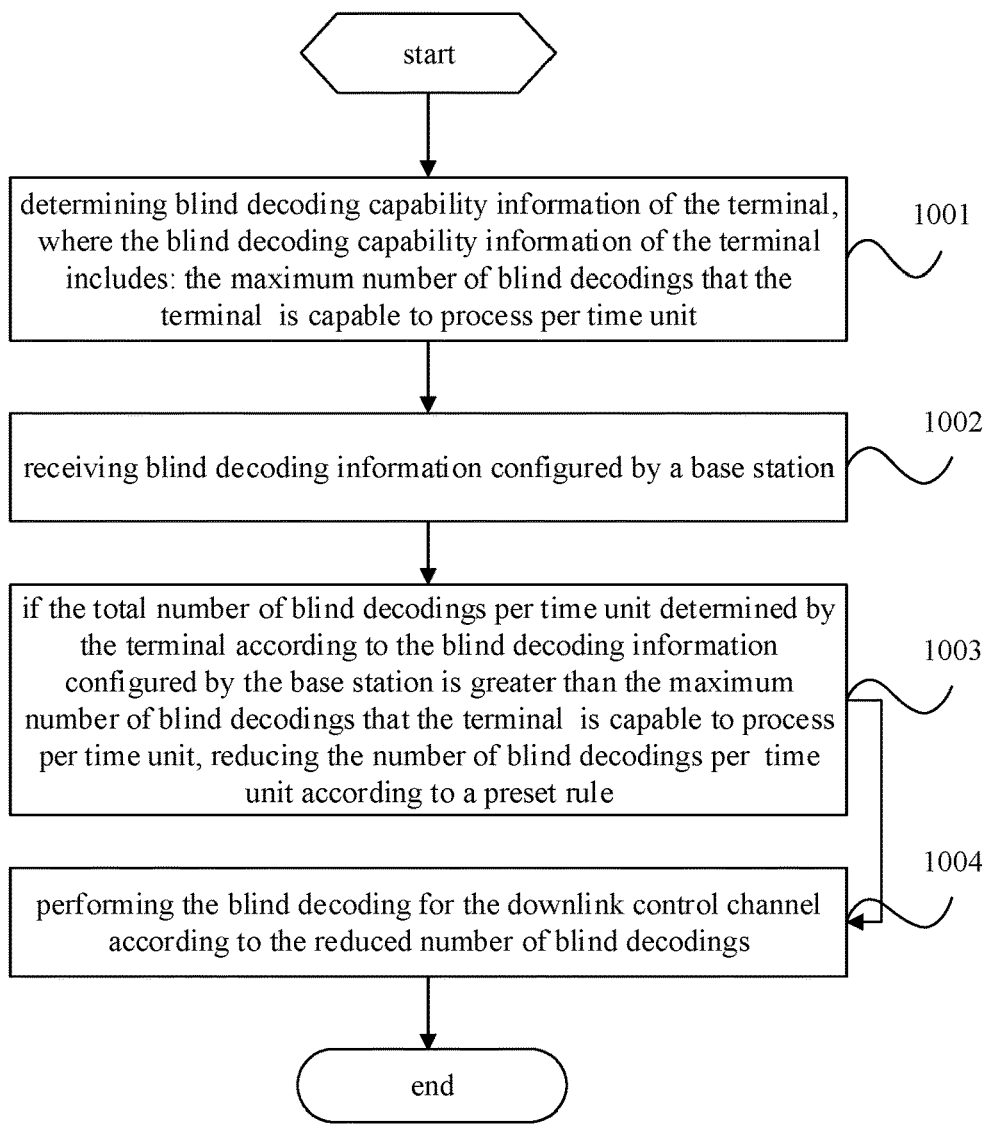
FIG. 10 is a flowchart illustrating a blind decoding method according to an embodiment of the present disclosure.

As shown in FIG. 10, an embodiment of the present disclosure further provides a blind decoding method, applied to a terminal, including following operations.

In step 1001, blind decoding capability information of the terminal is determined, in which the blind decoding capability information of the terminal includes: the maximum number of blind decodings that the terminal is capable to process per time unit.

It should be noted that the blind decoding capability information of the terminal specifically refers to blind decoding capability information of the terminal for a downlink control channel (PDCCH). The blind decoding capability information is determined by the terminal. The terminal may determine blind decoding capability information of different terminals according to different services or cost requirements of the different terminal. Specifically, the blind decoding capability information of the terminal is defined as the maximum number of blind decodings that the terminal is capable to process per time unit.

In step 1002, blind decoding information configured by a base station is received.

The terminal may determine, according to the blind decoding information configured by the base station, the number of blind decodings configured by the base station and at which position, which type of uplink control information is blindly decoded. Generally, the total number of blind decodings per time unit configured by the base station is less than or equal to the maximum number of blind decodings that the terminal is capable to process per time unit. However, there are also special cases. For example, multiple base stations simultaneously perform configuration on the blind decoding behavior of the terminal, the total number of blind decodings per time unit configured by the base stations may be greater than the maximum number of blind decodings that the terminal is capable to process per time unit. For another example, when one base station performs configuration on the blind decoding behavior of the terminal, the total number of blind decodings per time unit configured by the base station may be greater than the maximum number of blind decodings that the terminal is capable to process per time unit due to impacts of other factors. As such, the total number of blind decodings per time unit configured by the base station is not specifically limited in the embodiment of the present disclosure.

In step 1003, if the total number of blind decodings per time unit determined by the terminal according to the blind decoding information configured by the base station is greater than the maximum number of blind decodings that the terminal is capable to process per time unit, the number of blind decodings per time unit is reduced according to a preset rule, so that the total number of blind decodings per time unit is less than or equal to the maximum number of blind decodings that the terminal is capable to process per time unit.

In this step, when the total number of blind decodings per time unit configured by the base station is greater than the maximum number of blind decodings that the terminal is capable to process per time unit, the terminal reduces the number of blind decodings according to the preset rule.

In step 1004, the blind decoding is performed for the downlink control channel according to the reduced number of blind decodings.

In this step, the number of blind decodings obtained after the number of blind decodings configured by the base station is reduced is the actual number of blind decodings performed by the terminal, thereby ensuring that the actual number of blind decodings performed by the terminal is less than or equal to the maximum number of blind decodings that the terminal is capable to process, avoiding bringing additional blind decoding pressure to the terminal, and ensuring the reliability of each blind decoding.

Specifically, in the foregoing embodiment of the present disclosure, the time unit is one slot or multiple slots. Alternatively, the time unit is one subframe or multiple subframes. Alternatively, the time unit is one mini-slot or multiple mini-slots. Alternatively, the time unit is a preset time period (the preset time period may be an absolute time unit, such as 1 ms, 2 ms, etc.). Alternatively, the time unit is one transmission time interval (TTI) or multiple TTIs.

Specifically, in the above embodiment of the present disclosure, the maximum number of blind decodings is the sum of the number of blind decodings with one blind decoding type or multiple blind decoding types.

The blind decoding type includes: blind decoding for a downlink control channel based on a common search space, blind decoding for a downlink control channel based on a UE specific search space taking a slot length as a time interval, and/or blind decoding for a downlink control channel based on the UE specific search space taking a mini-slot length as the time interval.

In each blind decoding type, the number of blind decodings includes: the number of times the terminal decodes at least one type of downlink control information in at least one candidate resource of at least one control resource set.

It should be noted that the terminal may perform the blind decoding for the PDCCH at one control resource set or multiple control resource sets; and/or, the terminal may perform the blind decoding for the PDCCH at one candidate resource or candidate resources; and/or, the terminal may decode one type of DCI or a plurality of types of DCI. The number of the control resource sets, the number of the candidate resources, and the type of the DCI may be configured by the base station.

Optionally, the step 1001 in the foregoing embodiment of the disclosure includes:

determining the blind decoding capability information of the terminal at different aggregation levels of the downlink control channel, respectively; in which the terminal has the same blind decoding capability information at the different aggregation levels of the downlink control channel, or the terminal has different blind decoding capability information at the different aggregation levels of the downlink control channel.

If the terminal has the same blind decoding capability information at the different aggregation levels of the downlink control channel, i.e., the blind decoding capability of the terminal is not related to the aggregation level of the PDCCH, the aggregation levels of the PDCCH are not distinguished, and the blind decoding capability at the different aggregation levels is treated as the same.

If the terminal has different blind decoding capability information at the different aggregation levels of the downlink control channel, i.e., the blind decoding capability of the terminal is related to the aggregation level of the PDCCH, the aggregation levels of the PDCCH are distinguished, and the blind decoding capability is defined as blind decoding capability supported by one or more PDCCH aggregation levels. For example, the blind decoding capability information of the terminal for a PDCCH of which an aggregation level is 1 is: the maximum number of blind decodings performed by the terminal per time unit for the PDCCH of which the aggregation level is 1 is 100; the blind decoding capability information of the terminal for a PDCCH of which an aggregation level is 2 is: the maximum number of blind decodings performed by the terminal per time unit for the PDCCH of which the aggregation level is 2 is 80.

It should be noted that when the blind decoding capability of the terminal is related to the aggregation level of the PDCCH, it is not limited that different aggregation levels correspond to different aggregation capabilities. Multiple aggregation levels may be configured with the same aggregation capability, but not all aggregation levels are configured with the same aggregation capability. For example, the terminal has the same blind decoding capability for PDCCHs of which the aggregation level is 1, 2, and 4, respectively, which is set as 100; and the terminal has the same blind decoding capability for PDCCHs of which the aggregation level is 8, 16, and 32, respectively, which is set as 200. In this case, It is also considered that the blind decoding capability of the terminal is related to the aggregation level of the PDCCH.

Further, after the step 1001 of the embodiment of the present disclosure, the method further includes:

reporting the blind decoding capability information of the terminal to the base station.

Correspondingly, the step 1002 includes:

receiving blind decoding information configured by the base station according to the blind decoding capability information of the terminal.

That is, in the foregoing embodiment of the present disclosure, the terminal may report the blind decoding capability information of the terminal to the base station, or the terminal may not report the blind decoding capability information to the base station. When the terminal reports the blind decoding capability information to the base station, the base station configures the blind decoding information for the terminal by referring to the blind decoding capability information of the terminal. When the terminal does not report the blind decoding capability information to the base station, the base station configures the blind decoding information for the terminal by itself.

Further, the preset rule in the foregoing embodiment of the present disclosure includes:

linearly reducing the number of blind decodings for each blind decoding type; and/or, prioritizing various blind decoding types, and reducing the number of blind decodings for a blind decoding type with a low priority; and/or, if the terminal is configured to perform the blind decoding for the downlink control channel on multiple carriers, reducing the number of blind decodings for a carrier with a low priority according to priorities of the multiple carriers; that is, the terminal abandons blind decoding for a part of carriers with the low priority according to the priorities of the carrier, which ensures that the actual number of blind decodings does not exceed the maximum number of blind decodings. Specifically, the priority of the carrier may be set such that a Pcell is higher than a Scell, or the priority of the carrier is determined according to a serving cell index, which is not specifically limited herein.

Further, the step of linearly reducing the number of blind decodings for each blind decoding type described in the above embodiment of the present disclosure includes:

the number of blind decodings obtained by linearly reducing the number of blind decodings for a preset blind decoding type is $Z_2 = \lfloor Z_1 \times (N/M) \rfloor$; in which M is the total number of blind decodings per time unit configured by the base station; $Z_1$ is the number of blind decodings for the preset blind decoding type per time unit configured by the base station; N is the maximum number of blind decodings that the terminal is capable to process per time unit; $Z_2$ is the number of blind decodings obtained by linearly reducing the number of blind decodings for the preset blind decoding type.

Specifically, $\lfloor Z_1 \times (N/M) \rfloor$ means rounding down "$Z_1 \times (N/M)$". For example, M is equal to 120 (where $Z_1$ of a first blind decoding type is equal to 40, $Z_1$ of a second blind decoding type is equal to 60, and $Z_1$ of a third blind decoding type is equal to 20), and N is equal to 100.

Then, $Z_2$ of the first blind decoding type is $Z_2 = \lfloor 40 \times (100/120) \rfloor = 33$; $Z_2$ of the second blind decoding type is $Z_2 = \lfloor 60 \times (100/120) \rfloor = 50$; and $Z_2$ of the third blind decoding type is $Z_2 = \lfloor 20 \times (100/120) \rfloor 16$. Therefore, the actual total number of blind decodings after the reduction is 33+50+16=99, which does not exceed the maximum number N (100) of times of blind decoding performed by the terminal per time unit.

Further, the step of reducing the number of blind decodings for a blind decoding type with a low priority in the above embodiment of the present disclosure includes:

reducing the type of the downlink control information in the blind decoding type with the low priority, that is, abandoning blind decoding for one or several types of the downlink control information; and/or, reducing the number of candidate resources in the blind decoding type with the low priority, that is, abandoning blind decoding for one or several types of the candidate resources; and/or, reducing the number of control resource sets in the blind decoding type with the low priority, that is, abandoning blind decoding for one or several control resource sets.

Specifically, the setting of the priority includes but is not limited to the following forms.

Example 1 of the priority: a priority of the blind decoding for a downlink control channel based on a common search space (common PDCCH) is higher than the blind decoding for a downlink control channel based on the UE specific search space taking a mini-slot length as a time interval (mini-slot based PDCCH) which is higher than the blind decoding for a downlink control channel based on a UE specific search space taking a slot length as a time interval (slot-based PDCCH).

Example 2 of the priority: the mini-slot based PDCCH is higher than the common PDCCH which is higher than the slot-based PDCCH.

Example 3 of the priority: the mini-slot based PDCCH is higher than the slot-based PDCCH which is higher than the common PDCCH. Or, other possible prioritizations may be used.

In summary, in the embodiment of the present disclosure, when the number of blind decodings configured by the network is greater than the maximum number of blind decodings that the terminal is capable to process, the terminal reduces the number of blind decodings according to the preset rule, thereby ensuring that the actual number of blind decodings performed by the terminal is less than or equal to the maximum number of blind decodings that the terminal is capable to process, avoiding bringing additional blind decoding pressure to the terminal, and ensuring the reliability of each blind decoding.

Figure 11:
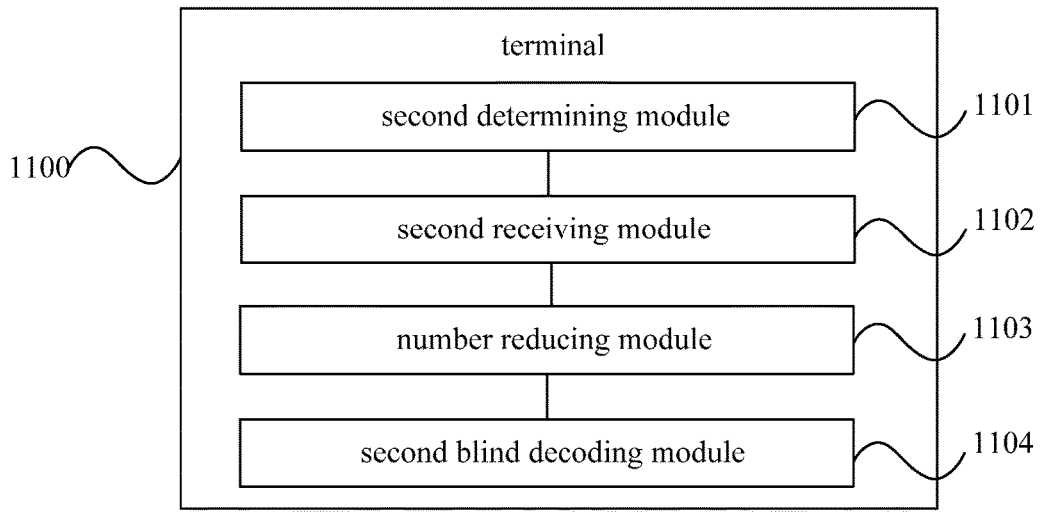
FIG. 11 is a fourth schematic diagram illustrating a terminal according to an embodiment of the present disclosure.

As shown in FIG. 11, an embodiment of the present disclosure further provides a terminal 1100, including:

a second determining module 1101, configured to determine blind decoding capability information of the terminal, in which the blind decoding capability information of the terminal includes: the maximum number of blind decodings that the terminal is capable to process per time unit;

a second receiving module 1102, configured to receive blind decoding information configured by a base station;

a number reducing module 1103, configured to, if the total number of blind decodings per time unit determined by the terminal according to the blind decoding information configured by the base station is greater than the maximum number of blind decodings that the terminal is capable to process per time unit, reduce the number of blind decodings per time unit according to a preset rule, so that the total number of blind decodings per time unit is less than or equal to the maximum number of blind decodings that the terminal is capable to process per time unit;

a second blind decoding module 1104, configured to perform the blind decoding for the downlink control channel according to the reduced number of blind decodings.

Specifically, the time unit is one slot or multiple slots. Alternatively, the time unit is one subframe or multiple subframes. Alternatively, the time unit is one mini-slot or multiple mini-slots. Alternatively, the time unit is a preset time period (the preset time period may be an absolute time unit, such as 1 ms, 2 ms, etc.). Alternatively, the time unit is one transmission time interval (TTI) or multiple TTIs.

Specifically, the maximum number of blind decodings is the sum of the number of blind decodings with one blind decoding type or multiple blind decoding types.

Specifically, the number of blind decodings includes: the number of times the terminal decodes at least one type of downlink control information in at least one candidate resource of at least one control resource set.

Specifically, the blind decoding type includes: blind decoding for a downlink control channel based on a common search space, blind decoding for a downlink control channel based on a UE specific search space taking a slot length as a time interval, and/or blind decoding for a downlink control channel based on the UE specific search space taking a mini-slot length as the time interval.

Specifically, the second determining module includes:

a second determining submodule, configured to determine the blind decoding capability information of the terminal at different aggregation levels of the downlink control channel, respectively; in which the terminal has the same blind decoding capability information at the different aggregation levels of the downlink control channel, or the terminal has different blind decoding capability information at the different aggregation levels of the downlink control channel.

Specifically, the terminal further includes:

a second reporting module, configured to report the blind decoding capability information of the terminal to the base station.

The second receiving module includes:

a second receiving submodule, configured to receive blind decoding information configured by the base station according to the blind decoding capability information of the terminal.

Specifically, the preset rule includes:

linearly reducing the number of blind decodings for each blind decoding type; and/or, prioritizing various blind decoding types, and reducing the number of blind decodings for a blind decoding type with a low priority; and/or, if the terminal is configured to perform the blind decoding for the downlink control channel on multiple carriers, reducing the number of blind decodings for a carrier with a low priority according to priorities of the multiple carriers.

When the preset rule includes linearly reducing the number of blind decodings for each blind decoding type, the number reducing module is configured to:

the number of blind decodings obtained by linearly reducing the number of blind decodings for a preset blind decoding type is $Z_2=\lceil Z_1 \times (N/M) \rceil$; in which M is the total number of blind decodings per time unit configured by the base station; $Z_1$ is the number of blind decodings for the preset blind decoding type per time unit configured by the base station; N is the maximum number of blind decodings that the terminal is capable to process per time unit; $Z_2$ is the number of blind decodings obtained by linearly reducing the number of blind decodings for the preset blind decoding type.

Specifically, when the preset rule includes prioritizing various blind decoding types, and reducing the number of blind decodings for a blind decoding type with a low priority, the number reducing module is configured to:

reduce the type of the downlink control information in the blind decoding type with the low priority; and/or, reduce the number of candidate resources in the blind decoding type with the low priority; and/or, reduce the number of control resource sets in the blind decoding type with the low priority.

In summary, in the embodiment of the present disclosure, when the number of blind decodings configured by the network is greater than the maximum number of blind decodings that the terminal is capable to process, the terminal reduces the number of blind decodings according to the preset rule, thereby ensuring that the actual number of blind decodings performed by the terminal is less than or equal to the maximum number of blind decodings that the terminal is capable to process, avoiding bringing additional blind decoding pressure to the terminal, and ensuring the reliability of each blind decoding.

It should be noted that the terminal provided by the embodiment of the present disclosure is a terminal corresponding to the above-described blind decoding method. All implementation manners of the foregoing embodiments are applicable to the terminal embodiment, and the same technical effects can be achieved.

An embodiment of the present disclosure also provides a terminal, including: a storage, a processor, and a computer program stored in the storage and executable by the processor. The computer program may be executed by the processor to implement various processes in the embodiments of the blind decoding method, and the same technical effects may be achieved. To avoid repetition, no further details are provided herein.

An embodiment of the present disclosure further provides a computer readable storage medium, in which the computer readable storage medium stores a computer program. The computer program may be executed by a processor to implement various processes in the embodiments of the blind decoding method, and the same technical effects may be achieved. To avoid repetition, no further details are provided herein. The computer readable storage medium may be a read-only memory (ROM), a random access memory (RAM), a magnetic disk, or an optical disk.

Figure 12:
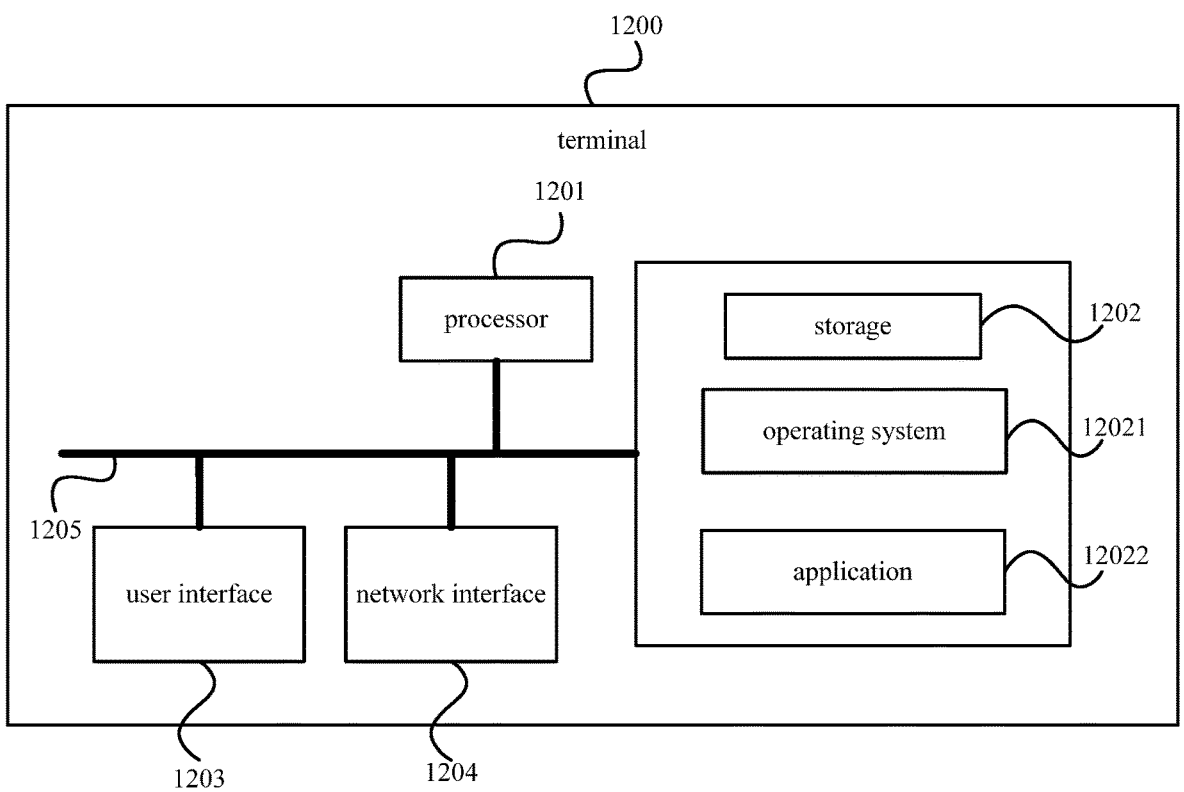
FIG. 12 shows a fifth schematic diagram illustrating a terminal according to an embodiment of the present disclosure.

FIG. 12 is a schematic diagram illustrating a terminal according to an embodiment of the present disclosure. An application entity of the blind decoding method provided by the present disclosure will be specifically described below in conjunction with FIG. 12.

A terminal 1200 as shown in FIG. 12 includes at least one processor 1201, a storage 1202, at least one network interface 1204, and a user interface 1203. The various components in terminal 1200 are coupled together by a bus system 1205. It can be understood that the bus system 1205 is used to implement connection communication between these components. The bus system 1205 includes a power bus, a control bus, and a status signal bus in addition to a data bus. However, for clarity of description, various buses are labeled as bus system 1205 in FIG. 12.

The user interface 1203 may include a display, a keyboard, or a clicking device (e.g., a mouse, a track ball, a touch pad, or a touch screen, etc.).

It can be understood that the storage 1202 in the embodiment of the present disclosure may be a volatile storage or a non-volatile storage, or may include both volatile and non-volatile storage. The non-volatile storage may be a read-only memory (ROM), a programmable ROM (PROM), an Erasable PROM (EPROM), an Electrically EPROM (EEPROM), or a flash memory. The volatile storage may be a Random Access Memory (RAM) that acts as an external cache. By way of example and not limitation, many forms of RAM are available, such as static RAM (SRAM), dynamic RAM (DRAM), synchronous DRAM (SDRAM), Double Data Rate SDRAM (DDRSDRAM), Enhanced SDRAM (ESDRAM), Synchlink DRAM (SLDRAM) and direct rambus RAM (DRRAM). The storage 1202 of the systems and methods described herein is intended to include, without being limited to, these and any other suitable types of storage.

In some embodiments, the storage 1202 stores elements such as executable modules or data structures, or a subset thereof, or an extended set thereof: an operating system 12021 and an application 12022.

The operating system 12021 includes various system programs, such as a framework layer, a core library layer, a driver layer, and the like, for implementing various basic services and processing hardware-based tasks. The application 12022 includes various applications, such as a Media Player, a Browser, etc., for implementing various application services. A program implementing the method of the embodiments of the present disclosure may be included in the application 12022.

In the embodiment of the present disclosure, through calling a program or an instruction stored in the storage 1202, which may be a program or an instruction stored in the application 12022, the processor 1201 is to: determine blind decoding capability information of the terminal, in which the blind decoding capability information of the terminal includes: the maximum number of blind decodings that the terminal is capable to process per time unit; receive blind decoding information configured by a base station; if the total number of blind decodings per time unit determined by the terminal according to the blind decoding information configured by the base station is greater than the maximum number of blind decodings that the terminal is capable to process per time unit, reduce the number of blind decodings per time unit according to a preset rule, so that the total number of blind decodings per time unit is less than or equal to the maximum number of blind decodings that the terminal is capable to process per time unit; perform the blind decoding for the downlink control channel according to the reduced number of blind decodings.

The method disclosed in the above embodiments of the present disclosure may be applied to the processor 1201 or implemented by the processor 1201. The processor 1201 may be an integrated circuit chip with signal processing capabilities. In the implementation process, each step of the above method may be implemented by an integrated logic circuit of hardware in the processor 1201 or an instruction in a form of software. The processor 1201 may be a general-purpose processor, a digital signal processor (DSP), an application specific integrated circuit (ASIC), a field programmable gate array (FPGA), or like programming logic devices, discrete gates or transistor logic devices, discrete hardware components. The methods, steps, and logical block diagrams disclosed in the embodiments of the present disclosure may be implemented or carried out. The general-purpose processor may be a microprocessor or any conventional processor. The steps of the method disclosed in the embodiments of the present disclosure may be directly implemented by the hardware decoding processor, or may be implemented by a combination of hardware and software modules in the decoding processor. The software modules may be located in a conventional storage medium such as random access memory, flash memory, read only memory, programmable read only memory or electrically erasable programmable memory, registers, and the like. A storage medium is located in the storage 1202. The processor 1201 reads the information in the storage 1202 and implements the steps of the above method in combination with its hardware.

It can be understood that the embodiments described herein may be implemented in hardware, software, firmware, middleware, microcode, or a combination thereof. For hardware implementation, the processing unit may be implemented in one or more Application Specific Integrated Circuits (ASICs), Digital Signal Processing (DSP), Digital Signal Processing Device (DSP Device, DSPD), programmable Logic Device (PLD), Field-Programmable Gate Array (FPGA), general-purpose processor, controller, microcontroller, microprocessor, other electronic unit for performing the functions described herein or a combination thereof.

For a software implementation, the techniques described herein may be implemented by modules (e.g., procedures, functions, and so on) that perform the functions described herein. The software code may be stored in the storage and executed by the processor. The storage may be implemented inside the processor or outside the processor.

Optionally, in another embodiment of the present disclosure, the time unit is one slot or multiple slots. Alternatively, the time unit is one subframe or multiple subframes. Alternatively, the time unit is one mini-slot or multiple mini-slots. Alternatively, the time unit is a preset time period. Alternatively, the time unit is one TTI or multiple TTIs.

Optionally, as another embodiment, the maximum number of blind decodings is the sum of the number of blind decodings with one blind decoding type or multiple blind decoding types.

Optionally, as another embodiment, the number of blind decodings includes: the number of times the terminal decodes at least one type of downlink control information in at least one candidate resource of at least one control resource set.

Optionally, as another embodiment, the blind decoding type includes: blind decoding for a downlink control channel based on a common search space, blind decoding for a downlink control channel based on a UE specific search space taking a slot length as a time interval, and/or blind decoding for a downlink control channel based on the UE specific search space taking a mini-slot length as the time interval.

Optionally, as another embodiment, the process 1201 is to: determine the blind decoding capability information of the terminal at different aggregation levels of the downlink control channel, respectively; in which the terminal has the same blind decoding capability information at the different aggregation levels of the downlink control channel, or the terminal has different blind decoding capability information at the different aggregation levels of the downlink control channel.

Optionally, as another embodiment, the process 1201 is to: report the blind decoding capability information of the terminal to the base station, and receive blind decoding information configured by the base station according to the blind decoding capability information of the terminal.

Optionally, as another embodiment, the preset rule includes:
linearly reducing the number of blind decodings for each blind decoding type; and/or,
prioritizing various blind decoding types, and reducing the number of blind decodings for a blind decoding type with a low priority; and/or, if the terminal is configured to perform the blind decoding for the downlink control channel on multiple carriers, reducing the number of blind decodings for a carrier with a low priority according to priorities of the multiple carriers.

Optionally, as another embodiment, the number of blind decodings obtained by linearly reducing the number of blind decodings for a preset blind decoding type is $Z_2=[Z_1\times(N/M)]$; in which M is the total number of blind decodings per time unit configured by the base station; $Z_1$ is the number of blind decodings for the preset blind decoding type per time unit configured by the base station; N is the maximum number of blind decodings that the terminal is capable to process per time unit; $Z_2$ is the number of blind decodings obtained by linearly reducing the number of blind decodings for the preset blind decoding type.

Optionally, as another embodiment, the type of the downlink control information in the blind decoding type with the low priority may be reduced; and/or, the number of candidate resources in the blind decoding type with the low priority may be reduced; and/or, the number of control resource sets in the blind decoding type with the low priority may be reduced.

The terminal 1200 may implement various processes implemented by the terminal in the above-described embodiments. To avoid repetition, no further details are provided herein.

In summary, in the embodiment of the present disclosure, when the number of blind decodings configured by the network is greater than the maximum number of blind decodings that the terminal is capable to process, the terminal reduces the number of blind decodings according to the preset rule, thereby ensuring that the actual number of blind decodings performed by the terminal is less than or equal to the maximum number of blind decodings that the terminal is capable to process, avoiding bringing additional blind decoding pressure to the terminal, and ensuring the reliability of each blind decoding.

It should be noted that the terminal provided by the embodiment of the present disclosure is a terminal corresponding to the above-described blind decoding method. All implementation manners of the foregoing embodiments are applicable to the terminal embodiment, and the same technical effects can be achieved.

The various embodiments in the present disclosure are described in a progressive manner. Each embodiment focuses on differences from other embodiments. The same or similar parts between the various embodiments can be referred to each other.

Those skilled in the art will appreciate that embodiments of the disclosed embodiments can be provided as a method, an apparatus, or a computer program product. Thus, embodiments of the present disclosure can take the form of an entirely hardware embodiment, an entirely software embodiment, or a combination of software and hardware. Moreover, embodiments of the present disclosure may take the form of a computer program product embodied on one or more computer usable storage media (including but not limited to disk storage, CD-ROM, optical storage, etc.) including computer usable program codes.

Embodiments of the present disclosure are described with reference to flowcharts and/or block diagrams of methods, terminal devices (systems), and computer program products according to the embodiments of the present disclosure. It should be understood that each flow and/or block of the flowcharts and/or block diagrams and a combination of a flow and/or a block of the flowcharts and/or block diagrams may be implemented by computer program instructions. These computer program instructions can be provided to a processor of a general purpose computer, a special purpose computer, an embedded processor or another programmable data processing terminal device to produce a machine such that the instructions executed by the processor of the computer or the other programmable data processing terminal device produce an apparatus for implementing functions specified by one or more processes in the flowcharts and/or by one or more blocks in the block diagrams.

The computer program instructions can also be stored in a computer readable storage that can direct the computer or the other programmable data processing terminal device to operate in a particular manner, such that the instructions stored in the computer readable storage produce an article of manufacture comprising an instruction apparatus. The instruction apparatus implements functions specified by one or more processes in the flowcharts and/or by one or more blocks in the block diagrams.

These computer program instructions can also be loaded onto the computer or the other programmable data processing terminal device such that a series of operational steps are performed on the computer or the other programmable terminal device to produce computer-implemented processing, such that the instructions executed by the computer or the other programmable terminal device provide steps for implementing functions specified by one or more processes in the flowcharts and/or by one or more blocks in the block diagrams.

While the preferred embodiments of the embodiments of the present disclosure have been described, it will be apparent that those skilled in the art can make further changes and modifications to the embodiments. Therefore, the appended claims are intended to be interpreted as including the preferred embodiments and all changes and modifications that fall within the scope of the embodiments of the present disclosure.

It should also be noted that in the present disclosure, relational terms such as first and second are used merely to distinguish one entity or operation from another entity or operation, and do not necessarily require or imply there is any such actual relationship or order among these entities or operations. Furthermore, the terms "comprise", "include" or any other variations are intended to encompass a non-exclusive inclusion, such that a process, method, commodity, or device that include a series of elements include not only those elements but also other elements that are not explicitly listed, or elements that are inherent to such process, method, commodity, or device. Without more restrictions, an element defined by the phrase "include a . . . " does not exclude the presence of an additional equivalent element in the process, method, commodity, or device including the element.

The above are several embodiments of the present disclosure, and are not used for limiting the protection scope of the present disclosure. Any modifications, equivalents, improvements, etc., made under the principle of the present disclosure should be included in the protection scope of the present disclosure. As such, the protection scope of the present disclosure should be determined by the scope of the claims.

What is claimed is:

1. A method for reporting a blind decoding capability, applied to a terminal, comprising:

determining blind decoding capability information of the terminal, wherein the blind decoding capability information of the terminal comprises: a maximum number of blind decodings that the terminal is capable to process per time unit;
  reporting the blind decoding capability information of the terminal to a base station;
  wherein the determining the blind decoding capability information of the terminal, comprises:
    determining the blind decoding capability information of the terminal at different aggregation levels of a downlink control channel, respectively; wherein the terminal has different blind decoding capability information at the different aggregation levels of the downlink control channel.

2. The method according to claim 1, wherein after the reporting the blind decoding capability information of the terminal to a base station, the method further comprises:
  receiving blind decoding information configured by the base station according to the blind decoding capability information of the terminal, and performing blind decoding for a downlink control channel according to the blind decoding information.

3. The method according to claim 1, wherein the time unit is one slot or multiple slots; or the time unit is one subframe or multiple subframes; or the time unit is one mini-slot or multiple mini-slots; or the time unit is a preset time period; or the time unit is one transmission time interval (TTI) or multiple TTIs.

4. The method according to claim 1, wherein the maximum number of blind decodings is a sum of the number of blind decodings with one blind decoding type or multiple blind decoding types.

5. The method according to claim 4, wherein the number of blind decodings comprises: the number of times the terminal decodes at least one type of downlink control information in at least one candidate resource of at least one control resource set.

6. The method according to claim 4, wherein the blind decoding type comprises: blind decoding for a downlink control channel based on a common search space, blind decoding for a downlink control channel based on a UE specific search space taking a slot length as a time interval, and/or blind decoding for a downlink control channel based on the UE specific search space taking a mini-slot length as the time interval.

7. The method according to claim 1, wherein when the terminal has the different blind decoding capability information at the different aggregation levels of the downlink control channel, the reporting the blind decoding capability information of the terminal to a base station, comprises:
  reporting the blind decoding capability information of the terminal at the different aggregation levels of the downlink control channel to the base station.

8. A terminal, comprising: a storage, a processor, and a computer program stored in the storage and executable by the processor, wherein the computer program is executed by the processor to implement the method for reporting a blind decoding capability according to claim 1.

9. A blind decoding configuration method, applied to a base station, comprising:
  receiving blind decoding capability information of a terminal reported by the terminal; wherein the blind decoding capability information of the terminal comprises: a maximum number of blind decodings that the terminal is capable to process per time unit;
  configuring blind decoding information according to the blind decoding capability information of the terminal, and sending the blind decoding information to the terminal;
  wherein the terminal has different blind decoding capability information at the different aggregation levels of the downlink control channel.

10. The method according to claim 9, wherein the time unit is one slot or multiple slots; or the time unit is one subframe or multiple subframes; or the time unit is one mini-slot or multiple mini-slots; or the time unit is a preset time period; or the time unit is one transmission time interval (TTI) or multiple TTIs.

11. The method according to claim 9, wherein the maximum number of blind decodings is a sum of the number of blind decodings with one blind decoding type or multiple blind decoding types.

12. The method according to claim 11, wherein the blind decoding type comprises: blind decoding for a downlink control channel based on a common search space, blind decoding for a downlink control channel based on a UE specific search space taking a slot length as a time interval, and/or blind decoding for a downlink control channel based on the UE specific search space taking a mini-slot length as the time interval.

13. A base station, comprising: a storage, a processor, and a computer program stored in the storage and executable by the processor, wherein the computer program is executed by the processor to implement the blind decoding configuration method according to claim 9.

14. A blind decoding method, applied to a terminal, comprising:
  determining blind decoding capability information of the terminal; wherein the blind decoding capability information of the terminal comprises: a maximum number of blind decodings that the terminal is capable to process per time unit;
  receiving blind decoding information configured by a base station;
  if a total number of blind decodings per time unit determined by the terminal according to the blind decoding information configured by the base station is greater than the maximum number of blind decodings that the terminal is capable to process per time unit, reducing the number of blind decodings per time unit according to a preset rule, so that the total number of blind decodings per time unit is less than or equal to the maximum number of blind decodings that the terminal is capable to process per time unit;
  performing blind decoding for a downlink control channel according to the reduced number of blind decodings.

15. The method according to claim 14, wherein the time unit is one slot or multiple slots; or the time unit is one subframe or multiple subframes; or the time unit is one mini-slot or multiple mini-slots; or the time unit is a preset time period; or the time unit is one transmission time interval (TTI) or multiple TTIs.

16. The method according to claim 14, wherein the maximum number of blind decodings is a sum of the number of blind decodings with one blind decoding type or multiple blind decoding types.

17. The method according to claim 16, wherein the blind decoding type comprises: blind decoding for a downlink control channel based on a common search space, blind decoding for a downlink control channel based on a UE specific search space taking a slot length as a time interval, and/or blind decoding for a downlink control channel based on the UE specific search space taking a mini-slot length as the time interval.

18. The method according to claim 16, wherein the preset rule comprises:
   linearly reducing the number of blind decodings for each blind decoding type; and/or,
   prioritizing various blind decoding types, and reducing the number of blind decodings for a blind decoding type with a low priority; and/or,
   if the terminal is configured to perform the blind decoding for the downlink control channel on multiple carriers, reducing the number of blind decodings for a carrier with a low priority according to priorities of the multiple carriers.

19. A terminal, comprising: a storage, a processor, and a computer program stored in the storage and executable by the processor, wherein the computer program is executed by the processor to implement the blind decoding method according to claim 14.

* * * * *